D. J. CALHOON.
ANIMAL RELEASING DEVICE.
APPLICATION FILED APR. 10, 1915.
1,167,793.
Patented Jan. 11, 1916.
2 SHEETS—SHEET 1.
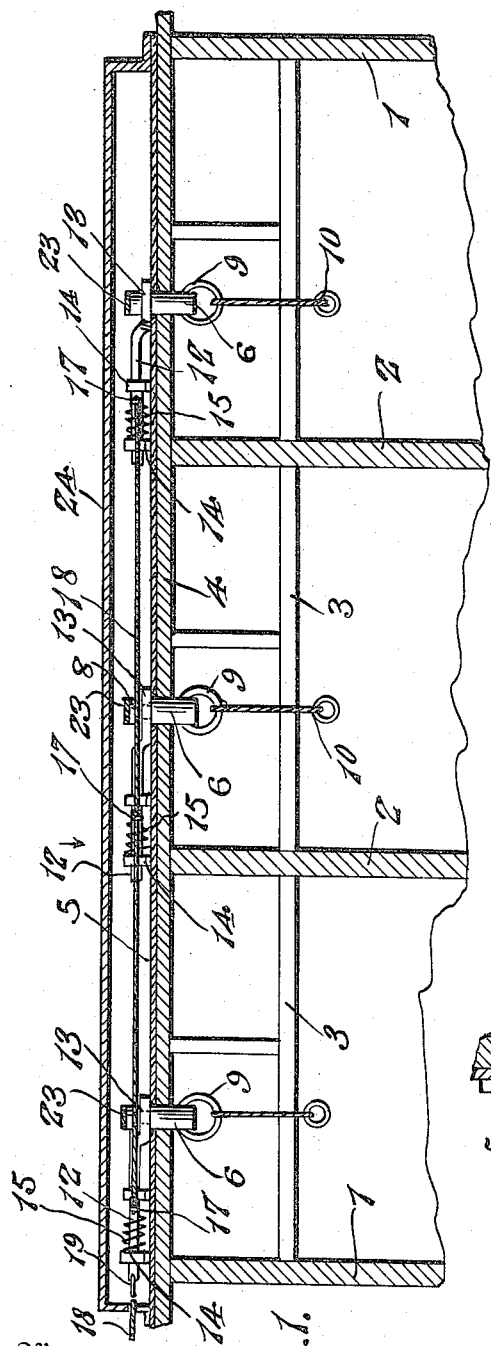
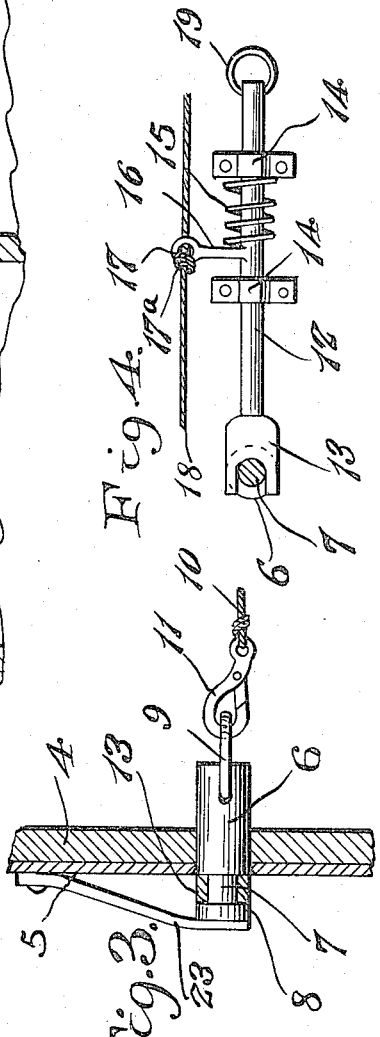
Inventor
D. J. Calhoon.

D. J. CALHOON.
ANIMAL RELEASING DEVICE.
APPLICATION FILED APR. 10, 1915.
1,167,793.
Patented Jan. 11, 1916.
2 SHEETS—SHEET 2.
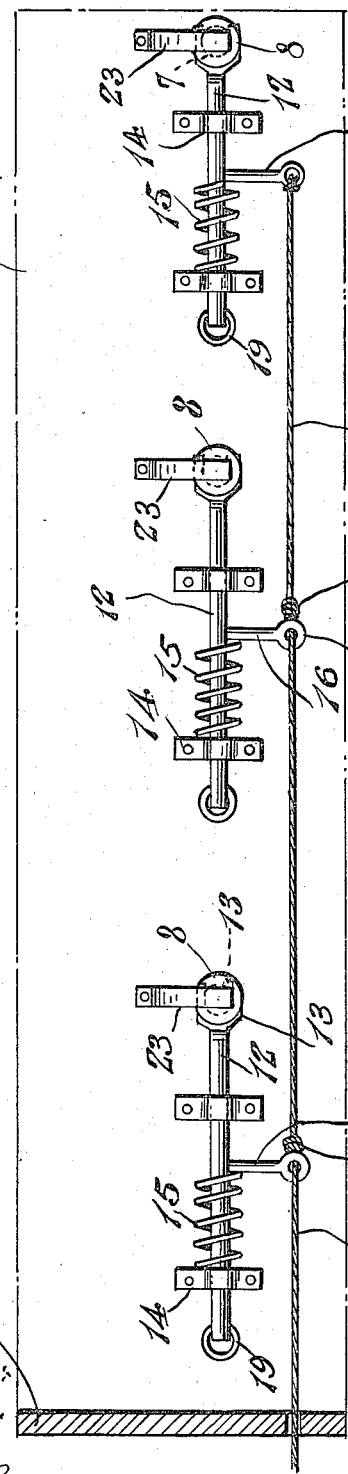
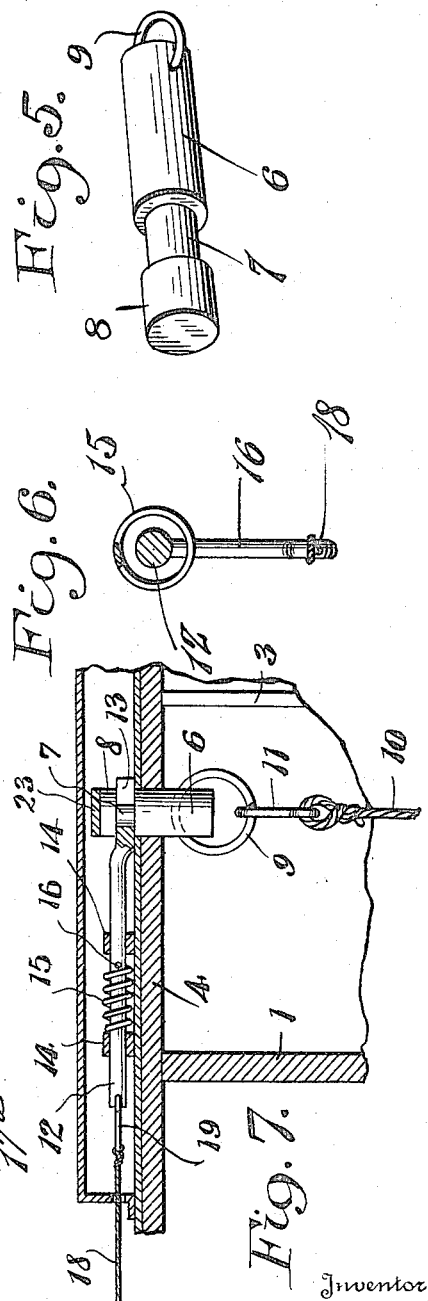
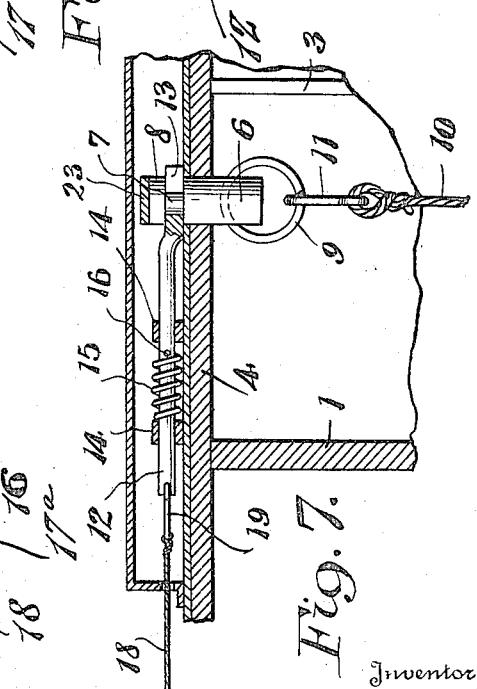
Inventor,
D. J. Calhoon.

UNITED STATES PATENT OFFICE.

DANIEL J. CALHOON, OF CHARTER OAK, IOWA.

ANIMAL-RELEASING DEVICE.

1,167,793.   Specification of Letters Patent.   Patented Jan. 11, 1916.

Application filed April 10, 1915.   Serial No. 20,471.

*To all whom it may concern:*

Be it known that I, DANIEL JOHN CALHOON, a citizen of the United States, residing at Charter Oak, in the county of Crawford and State of Iowa, have invented certain new and useful Improvements in Animal-Releasing Devices; and I do hereby declare the following to be a full, clear, and exact description of the invention, such as will enable others skilled in the art to which it appertains to make and use the same.

This invention relates to animal releasing devices, designed more particularly for use in connecting animals within stalls in a stable, and comprising means whereby each horse may be readily detached therefrom and means being provided whereby all the horses may be released at once in case of fire or in any other emergency.

Another object of the invention is to provide a releasing device of comparatively simple construction which will be reliable in operation and which can be installed in any stable at comparatively low cost.

The foregoing and other objects may be attained by means of the construction illustrated in the accompanying drawings, in which—

Figure 1 is a top plan view and partial section of an animal releasing device made in accordance with this invention, Fig. 2 is a view in elevation looking in the direction of the arrow in Fig. 1 with the casing removed, Fig. 3 is a detail sectional view showing the plug to which a horse is to be attached, and the spring for throwing the plug out of connection with the wall of the stable when the plug is released by the sliding lever, Fig. 4 is a detail side elevation and partial section of the spring actuated sliding lever for securing the plug to the wall of the stable, Fig. 5 is a perspective view of said releasing plug disconnected from the sliding releasing lever, and Fig. 6 is a sectional view of the releasing lever and the spring surrounding it. Fig. 7 is a horizontal sectional view.

Referring to the drawing, the numeral 1 designates the opposite sides of the stable, and 2 are the stall partitions within the stable, while 3 are the feed troughs. Connected to a wall or partition 4 is a plate 5, forming a base plate for the releasing mechanism.

In each of the stalls there is an animal releasing device, and since these devices are all substantially identical in construction, the description of one will serve as a description for all.

Extending through an opening in the wall 4 and plate 5 is a releasing plug 6, said plug having a reduced neck 7 and a head 8, while at the opposite end of the plug within the stall, is a ring 9 to which a halter strap 10 may be connected either by a knot tied in the ring 9 or by means of a snap hook 11.

A sliding releasing member 12 is provided with a bifurcated head 13, the two prongs of which engage the neck 7 of the plug and hold it against withdrawal. The lever 12 is mounted in keepers 14 secured to the base plate 5 and said lever is provided with a round shank which extends through the keepers 14 and said shank is encircled by a spring 15, one end of which bears against one of the keepers 14, while the other end thereof bears against a stud 16 provided with a ring 17 to which a cord or wire 18 is connected, said cord having a knot 17ª therein at one side of the stud 16. The free end of the sliding lever 12 has a ring 19 connected thereto. A spring 23 secured to the plate 5 bears at its free end upon the head 8 of the plug 6, as shown more clearly in Fig. 3, and when the plug 6 is released by the withdrawal of the head 13 of the sliding lever 12, the stress of the spring 23 is exerted to push the plug within the stall to release the animal. The mechanism is entirely covered by a casing or sheet metal cover 24. The cord or cable 18 is connected up in series to the rings 17 by the knots 17ª so that by pulling upon said cable from the outside of the stable, all the horses may be released simultaneously. It will also be obvious that any particular horse may be released by detaching the snap hook 11.

From the foregoing it will be obvious that an animal releasing device made in accordance with this invention can be installed in a stable at slight cost, and will serve as a reliable and efficient means for disconnecting all the animals from their stalls in case of fire or other emergency.

Various changes may be made in the details of construction without departing from the spirit and scope of the invention as defined in the claims.

What is claimed is:—

1. An animal releasing device comprising a releasing plug fitted in an aperture in a stable wall, said releasing plug having a reduced neck, a sliding lever mounted in keepers to engage said neck, a spring for expelling said plug, said sliding lever being spring actuated, and a wire connected to said lever for withdrawing it from engagement with the reduced portion of the plug, to permit said spring to expel said plug and detach the animal connected thereto.

2. An animal releasing device comprising a base plate, a series of sliding releasing levers mounted on said base plate, a series of releasing plugs extending through said plate to be engaged by said levers, springs for sliding said levers in one direction to engage said plugs, and a wire connected to said levers for releasing said plugs, and a spring for expelling each of said plugs, the latter being provided each with a ring for connecting a halter strap thereto.

3. An animal releasing device comprising a series of plugs, means for connecting said plugs to an animal, means for holding said plugs within apertures in the wall of a stall, said means being spring actuated, and means for releasing said holding means, and means for expelling the plugs.

In testimony whereof I affix my signature in presence of two witnesses.

DANIEL J. CALHOON.

Witnesses:
E. W. TIMM,
E. L. LYONS.

Copies of this patent may be obtained for five cents each, by addressing the "Commissioner of Patents, Washington, D. C."